(12) United States Patent
Ho et al.

(10) Patent No.: US 10,915,833 B2
(45) Date of Patent: Feb. 9, 2021

(54) MACHINE LEARNING ALGORITHM WITH BINARY PRUNING TECHNIQUE FOR AUTOMATIC INTRAPULSE MODULATION RECOGNITION

(71) Applicant: Raytheon Company, Waltham, MA (US)

(72) Inventors: Phuoc T. Ho, Westminster, CO (US); Bruce R. Anderson, Santa Barbara, CA (US); Dan Hammack, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 931 days.

(21) Appl. No.: 15/499,653

(22) Filed: Apr. 27, 2017

(65) Prior Publication Data

US 2018/0314974 A1    Nov. 1, 2018

(51) Int. Cl.
*G06N 20/00* (2019.01)
*G01S 7/02* (2006.01)

(52) U.S. Cl.
CPC ............. *G06N 20/00* (2019.01); *G01S 7/021* (2013.01)

(58) Field of Classification Search
CPC ................................. G06N 20/00; G01S 7/021
See application file for complete search history.

(56) References Cited

U.S. PATENT DOCUMENTS

| 6,934,342 | B1* | 8/2005 | Ishii | H04L 27/0012 375/316 |
| 7,133,856 | B2* | 11/2006 | Huang | G16H 50/70 706/21 |
| 7,428,270 | B1* | 9/2008 | Dubuc | H04L 27/0012 375/224 |
| 2008/0294315 | A1* | 11/2008 | Breed | B60N 2/002 701/49 |

(Continued)

OTHER PUBLICATIONS

Eric R. Zilberman, "Autonomous Time-Frequency Cropping and Feature-Extraction Algorithms for Classification of LPI Radar Modulations", Jun. 2006. (Year: 2006).*

(Continued)

*Primary Examiner* — Kamran Afshar
*Assistant Examiner* — Imad Kassim (57) ABSTRACT

Radio signals including modulated radar signals of an unknown modulation type selected from among a predetermined group of modulation types are received, and a plurality of features are extracted for the received radio signals. A plurality of two dimensional (2D) maps are generated for pairs of the extracted features from the received radio signals. The 2D maps of extracted feature pairs for the received radio signals are processed using a binary tree of discriminating vectors, each of the discriminating vectors corresponding to recognition of at least one of the predetermined modulation types based on 2D feature maps and each of the discriminating vectors determined by processing 2D maps for pairs of features extracted from training samples using a support vector machine learning algorithm.

(Continued)

The binary tree is derived by pruning permutations of sequences for applying the discriminating vectors according to iterative testing of modulation type recognition accuracy.

20 Claims, 11 Drawing Sheets

(56) References Cited

U.S. PATENT DOCUMENTS

| | | | |
|---|---|---|---|
| 2013/0036521 A1* | 2/2013 | Prater | B82Y 35/00 850/56 |
| 2017/0094527 A1* | 3/2017 | Shattil | H04L 43/18 |
| 2017/0201407 A1* | 7/2017 | Suh | H03M 13/2792 |
| 2017/0224238 A1* | 8/2017 | Arunachalam | A61B 5/046 |
| 2019/0196578 A1* | 6/2019 | Iodice | G06F 3/011 |

OTHER PUBLICATIONS

Danishi Wang, "Modulation Format Recognition and OSNR Estimation Using CNN-Based Deep Learning", IEEE, 1667-1670 (Year: 2017).*

Lan-Xun Wang, "Algorithm of Digital Modulation Recognition Based on Support Vector Machines", IEEE, 980-983, Jul. 2009 (Year: 2009).*

Shengliang Peng, "Modulation Classification Using Convolutional Neural Network Based Deep Learning Model", IEEE, Apr. 7-8, 2017 (Year: 2017).*

Iglesias et al.; "Real-Time Low-Complexity Automatic Modulation Classifier for Pulsed Radar Signals"; IEEE Transactions on Aerospace and Electronic Systems; vol. 51, Issue 1; Jan. 2015; 19 pages.

Zhang et al.; "Radar Emitter Signal Recognition Based on Support Vector Machines"; 8th International Conference on Control, Automation, Robotics and Vision; Kunming, China; Dec. 6-9, 2004; 6 pages.

Ren et al.; "Radar Emitter Signal Classification based on Mutual Information and Fuzzy Support Vector Machines"; 9th International Conference on Signal Processing (ICSP 2008); Bejing, China; Oct. 26-29, 2008; 6 pages.

Vanhoy et al.; "Classification of LPI radar signals using spectral correlation and support vector machines"; Analog Integrated Circuits and Signal Processing; vol. 91, Issue 2; Feb. 2017; 9 pages.

Zhang et al.; "Automatic Construction Algorithm for Multi-class Support Vector Machines with Binary Tree Architecture"; International Journal of Computer Science and Network Security (IJCSNS); vol. 6, No. 2A; Feb. 2006; 6 pages.

Madzarov et al.; "A Multi-class SVM Classifier Utilizing Binary Decision Tree"; Informatica; vol. 33, No. 2; 2009; 10 pages.

Foreign Communication from Related Counterpart Application; PCT Patent Application No. PCT/US2018/012891; International Search Report and Written Opinion of the International Searching Authority dated Apr. 19, 2018; 16 pages.

Dobre et al., "A Survey of Automatic Modulation Classification Techniques: Classical Approaches and New Trends", IET Communications, vol. 1, Issue 2, 2007, pp. 137-156.

Wei et al., "Maximum-Likelihood Classification for Digital Amplitude-Phase Modulations", IEEE Transactions on Communications, vol. 48, No. 2, Feb. 2000, 5 pages.

Hong et al., "Classification of BPSK and QPSK Signals with Unknown Signal Level Using the Bayes Technique", Proceedings of the 2003 International Symposium on Circuits and Systems, May 2003, 4 pages.

* cited by examiner

MACHINE LEARNING ALGORITHM WITH BINARY PRUNING TECHNIQUE FOR AUTOMATIC INTRAPULSE MODULATION RECOGNITION

TECHNICAL FIELD

The present disclosure is directed in general to recognizing modulation of radio signals and more particularly to quickly and efficiently recognizing any of a number of specific modulation types.

BACKGROUND OF THE DISCLOSURE

Current classification techniques for intentional modulation on pulses (IMOP) of signals of interest (SOI) lack sufficient accuracy in part because there are many different types and classes of SOIs, which may not be known ahead of time, making the problem more difficult.

SUMMARY OF THE DISCLOSURE

In one embodiment, radio signals including modulated radar signals of an unknown modulation type selected from among a predetermined group of modulation types are received, and a plurality of features are extracted for the received radio signals. A plurality of two dimensional (2D) maps are generated for pairs of the extracted features from the received radio signals. The 2D maps of extracted feature pairs for the received radio signals are processed using a binary tree of discriminating vectors, each of the discriminating vectors corresponding to recognition of at least one of the predetermined modulation types based on 2D feature maps and each of the discriminating vectors determined by processing 2D maps for pairs of features extracted from training samples using a support vector machine learning algorithm. The binary tree is derived by pruning permutations of sequences for applying the discriminating vectors according to iterative testing of modulation type recognition accuracy. The extracted features may optionally comprise mean square error (MSE) between an unwrapped phase and a least squares (LS) linear fitting of the unwrapped phase, MSE between the unwrapped phase and a LS parabolic fitting of the unwrapped phase, variance in an instantaneous frequency, kurtosis of the instantaneous frequency, MSE between an unwrapped binary phase and a LS linear fitting of the unwrapped binary phase, and MSE between an unwrapped quadrature phase and a LS linear fitting of the unwrapped quadrature phase. The 2D maps for pairs of the extracted features from the received radio signals may optionally comprise MSE between unwrapped phase and the LS parabolic fitting of the unwrapped phase plotted against MSE between the unwrapped phase and the LS linear fitting of the unwrapped phase, kurtosis of the instantaneous frequency plotted against variance in the instantaneous frequency, and MSE between the unwrapped quadrature phase and the LS linear fitting of the unwrapped quadrature phase plotted against MSE between the unwrapped binary phase and the LS linear fitting of the unwrapped binary phase. The predetermined modulation types may optionally comprise: no modulation; linear frequency modulation; binary phase shift key modulation; quadrature phase shift key modulation; each of T1, T2, T3 and T4 polytime code modulation; Costas code modulation; Frank code modulation; and each of P1, P2, P3 and P4 polyphase code modulation. Each of the discriminating vectors determined using a support vector machine learning algorithm may optionally comprise a support vector having equal margins from data differentiated by the respective support vector. The binary tree may optionally be in the form of discriminating vectors applied in the following sequence by modulation type(s) until the unknown modulation type is recognized: no modulation; linear frequency modulation; quadrature phase shift key modulation; T1 polytime code modulation; T3 polytime code modulation; T2 polytime code modulation; T4 polytime code modulation; binary phase shift key modulation; Costas code modulation; either of P3 and P4 polyphase code modulation; Frank code modulation; and either of P1 and P2 polyphase code modulation. Correct recognition and classification of the unknown modulation type preferably occurs greater than 94% to 97% of the time for each of the predetermined group of modulation types. Three hundred (300) training samples for each of the predetermined group of modulation types are preferably used by the support vector machine learning algorithm to determine the discriminating vectors.

In a second embodiment, training samples for modulated radar signals of each of a predetermined group of modulation types are generated. A plurality of features for the training samples are extracted. A plurality of two dimensional (2D) maps are generated for pairs of the extracted features from the training samples. The 2D maps of extracted feature pairs for the training samples are iteratively processed to determine a binary tree of discriminating vectors, each of the discriminating vectors corresponding to recognition of at least one of the predetermined modulation types based on the 2D feature maps and each of the discriminating vectors determined by processing the 2D maps for pairs of features extracted from training samples using a support vector machine learning algorithm. The binary tree is derived by pruning permutations of sequences for applying the discriminating vectors according to iterative testing of modulation type recognition accuracy. The extracted features may optionally comprise mean square error (MSE) between an unwrapped phase and a least squares (LS) linear fitting of the unwrapped phase, MSE between the unwrapped phase and a LS parabolic fitting of the unwrapped phase, variance in an instantaneous frequency, kurtosis of the instantaneous frequency, MSE between an unwrapped binary phase and a LS linear fitting of the unwrapped binary phase, and MSE between an unwrapped quadrature phase and a LS linear fitting of the unwrapped quadrature phase. The 2D maps for pairs of the extracted features from the received radio signals may optionally comprise MSE between unwrapped phase and the LS parabolic fitting of the unwrapped phase plotted against MSE between the unwrapped phase and the LS linear fitting of the unwrapped phase, kurtosis of the instantaneous frequency plotted against variance in the instantaneous frequency, and MSE between the unwrapped quadrature phase and the LS linear fitting of the unwrapped quadrature phase plotted against MSE between the unwrapped binary phase and the LS linear fitting of the unwrapped binary phase. The predetermined modulation types may optionally comprise: no modulation; linear frequency modulation; binary phase shift key modulation; quadrature phase shift key modulation; each of T1, T2, T3 and T4 polytime code modulation; Costas code modulation; Frank code modulation; and each of P1, P2, P3 and P4 polyphase code modulation.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale.

Detecting intentional modulation of radio frequency signals for communication or radar is beneficial for a number of purposes, including activating appropriate radar countermeasures such as jamming. Recognizing the type of modulation is important for effective jamming of hostile radar. Current nearest neighbor classification techniques work poorly for received signals with low signal-to-noise ratios (SNR). When the SNR is low, the accuracy of most conventional modulation recognition technique is degraded and results high false positive rates, in which the wrong modulation is incorrectly identified as being performed. In addition, different techniques work for specific subsets of modulation types, but not for all critical modulations types commonly implemented with an application of interest such as radar. Existing methods can typically only classify four classes of modulation out of the most critical modulation types to be recognized.

In the approach of the present disclosure, a unified approach to accurately classify many radar modulation types is implemented to automatically identify emitter radar inter-pulse modulation types with high accuracy and reduced false alarms. Support vector machine (SVM) machine learning algorithms are employed for signal classification. A binary pruning technique operating on multiple two-dimensional (2D) maps is employed for discriminating vector calculation. The resulting process has the ability to classify fourteen common modulation types with high accuracy, and retains the ability to be adapted to classify new modulation techniques as they become signals of interest.

Results from testing of fourteen types of modulation recognition using the approach of the present disclosure revealed superior performance. Based on 300 training samples produced by signal generators for each modulation type and an additional 300 test samples used to evaluate the accuracy of classification, 12 out of 14 tested signals show a correct classification rate of 97.5% or more, while the remaining 2 tested signals achieved correct classification rates between 94% and 97%.

Figure 1:
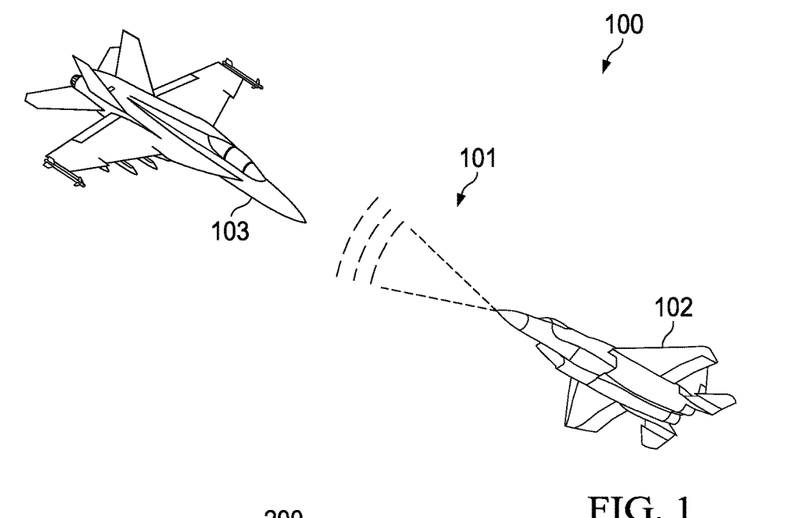
FIG. 1 is a diagram illustrating an environment within which automatic modulation recognition trained using a machine learning algorithm with binary pruning may be performed in accordance with embodiments of the present disclosure.

FIG. 1 is a diagram illustrating an environment within which automatic modulation recognition trained using a machine learning algorithm with binary pruning may be performed in accordance with embodiments of the present disclosure. Those skilled in the art will recognize that, for simplicity and clarity, some features and components are not explicitly shown, including those illustrated in connection with later figures. In the exemplary environment 100 of FIG. 1, signals 101 are transmitted by a transmitter system on a first aircraft 102 (or, in alternative embodiments, from a land-based installation) toward a second aircraft 103. An antenna array and associated signal processing system (described below, but not shown in FIG. 1) on the second aircraft 103 is configured to receive and process the radar signals, recognizing the type of modulation employed for the radar signals emitted by the first aircraft 102 in the manner described below.

Figure 2:
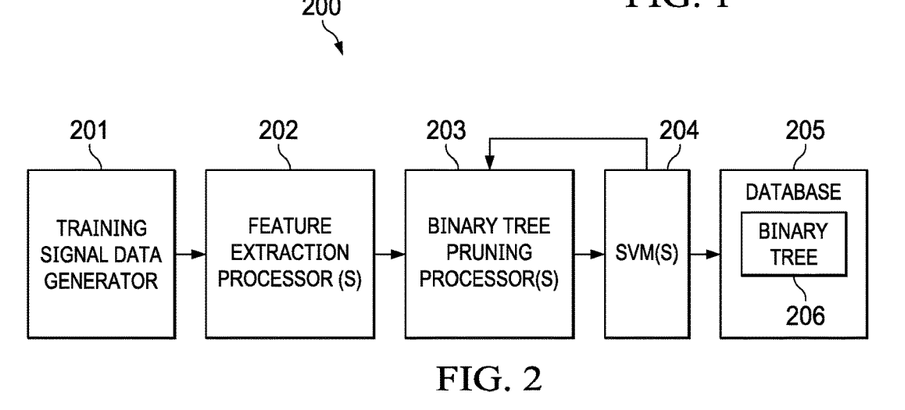
FIG. 2 is a high level block diagram of a machine learning system with binary pruning used to develop modulation recognition discriminating vectors for automatic modulation recognition in accordance with embodiments of the present disclosure.

FIG. 2 is a high level block diagram of a machine learning system with binary pruning used to develop modulation recognition discriminating vectors for automatic modulation recognition in accordance with embodiments of the present disclosure. The exemplary system illustrated may be employed separate from the aircraft 103 or a counterpart land-based radar installation to train modulation recognition for determining the modulation of radar signals, although other applications (e.g., communications) will be apparent to those skilled in the art. Those skilled in the art will recognize that, for simplicity and clarity, some features and components are not explicitly shown. For instance, although not explicitly shown, those skilled in the art will understand that the machine learning system 200 includes one or more memories storing instructions for producing modulation sample sets (e.g., software modulation simulators) and storing the produced sample sets, one or more processors for executing the instructions generating the sample sets and causing the produced sample sets to be stored, and storage or communication connections for transferring the produced sample sets to other systems. Each of the functional units described below as part of the machine learning system 200 may be implemented with separate memory and processor(s), or alternatively all of those functional units may be implemented using a common set of memories and processors. In addition, each of the functional units described below as part of the machine learning system 200 may operate separately or sequentially, or alternatively the functional units may operate concurrently in a pipelined fashion.

The machine learning system 200 includes a test or training signal data generator 201 producing sample sets for test signals with modulations, each sample set including a number samples for each type of modulation likely to be employed. In an exemplary embodiment, sample sets for fourteen types of modulation are produced by training signal data generator 201, with each set including 300 samples for the respective type of modulation. Other numbers of sample sets or samples per sets may be selected to improve accuracy of the trained model. The sample sets according to an exemplary embodiment are for the following modulation types: no modulation ("nm"); linear frequency modulation ("lfm"), binary phase shift key ("bpsk" or "2psk") modulation; quadrature phase shift key ("qpsk" or "4psk") modulation; four variants (T1, T2, T3 and T4) of polytime code modulation; Costas code modulation; Frank code modulation; and four variants (P1, P2, P3 and P4) of polyphase code modulation.

Each training sample within a sample set for a given modulation type is received by feature extraction processor(s) 202 that determine features of the respective modulation type. The extracted features include at least errors ("gamma") for the sample signal relative to the signal that is calculated for a modulation type being tested. In an exemplary embodiment, the features include:

- mean square error (MSE) between the unwrapped phase and a least squares (LS) linear fitting;
- MSE between unwrapped phase and a LS parabolic fitting;
- variance in the instantaneous frequency;
- kurtosis of the instantaneous frequency;
- MSE between the unwrapped (2x) phase and its LS linear fitting; and
- MSE between the unwrapped (4x) phase and its LS linear fitting.

These six features are calculated for the training samples and grouped into three sets that are used to create two dimensional (2D) feature maps as described further below.

The extracted features from the training sample sets are received from the feature extraction processor(s) 202 by a combination of binary tree pruning processor(s) 203 and support vector machine(s) (SVMs) 204 operating in iterative loops. The SVMs 204 calculate support vectors and candidate discrimination vectors (vector slope to be used for real time discrimination) for determining whether received signals (at this point, sample signals for a modulation type) exhibit modulation of the respective type. Permutations of binary trees sequentially applying the candidate discrimination vectors calculated by the SVMs 204 are successively pruned by the binary tree pruning processor(s) 203 to select a sequence of one (or a predetermined number of) the best discrimination vectors for each modulation type. The binary tree pruning processor(s) 203 determine the optimal path of the binary tree used for modulation recognition, based on visualization of the discriminating vectors. The binary tree pruning may be based on speed, accuracy, or some combination of those and other factors. The resulting binary tree 206 of discrimination vectors pruned from the various possible permutations and that will be used in real-time modulation recognition is stored in a database 205. The binary tree 206 should have one or more discrimination vectors for each modulation type. In some embodiments, alternative binary trees may be determined for different real world characteristics, such as different ranges of SNR, with best match criteria defined for selecting the result of parallel operation for those alternative binary trees.

Figure 3:
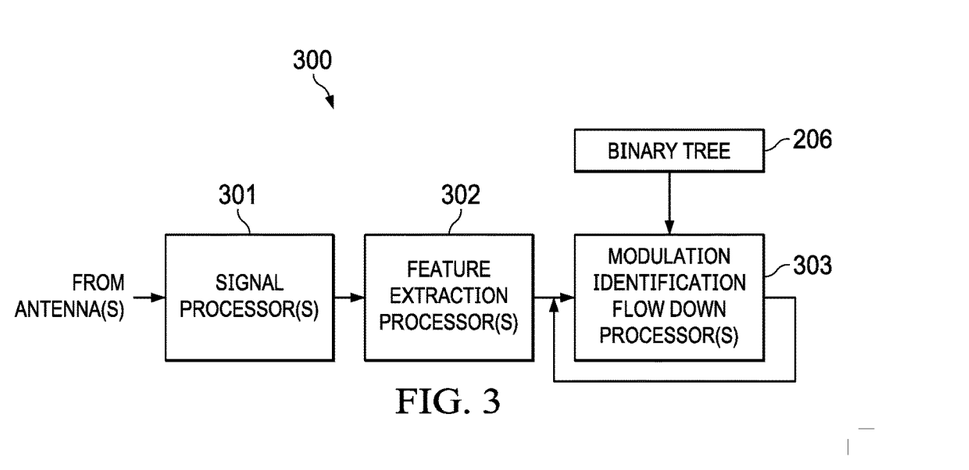
FIG. 3 is a high level block diagram of a real-time modulation recognition system for automatic modulation recognition in accordance with embodiments of the present disclosure.

FIG. 3 is a high level block diagram of a real-time modulation recognition system for automatic modulation recognition in accordance with embodiments of the present disclosure. The exemplary system illustrated are used on and in an aircraft or land-based radar installation to determine the modulation of radar signals, although other applications (e.g., communications) will be apparent to those skilled in the art. Once again, those skilled in the art will recognize that, for simplicity and clarity, some features and components are not explicitly shown. Although not explicitly shown, those skilled in the art will understand that the real-time modulation recognition system 300 includes one or more memories storing instructions for processing received radar signals and storing the recognition results, one or more processors for executing the instructions processing the received radar signals for modulation recognition. Each of the functional units described below as part of the real-time modulation recognition system 300 may be implemented with separate memory and processor(s), or alternatively all of those functional units may be implemented using a common set of memories and processors. In addition, each of the functional units described below as part of the real-time modulation recognition system 300 may operate separately or sequentially, or alternatively the functional units may operate concurrently in a pipelined fashion.

Real-time modulation recognition system 300 receives, from system antenna(s), radio signals possibly containing radar of an unknown modulation type. The received signals are processed by signal processor(s) 301 that collectively perform signal processing such as signal conditioning, amplification, filtering, etc. The processed, received signals are forwarded from signal processor(s) 301 to feature extraction processor(s) 302 that extract the same six features discussed above in connection with feature extraction processor(s) 202. As with the features calculated by feature extraction processor(s) 202, the features extracted by feature extraction processor(s) 302 are grouped by those processor(s) into three sets of 2D vectors. The vector sets are then forwarded by feature extraction processor(s) 302 to modulation identification flow down processor(s) 303 that identify any modulated radar signals within the received signals based, at least in part, on binary tree 206.

Figure 4A:
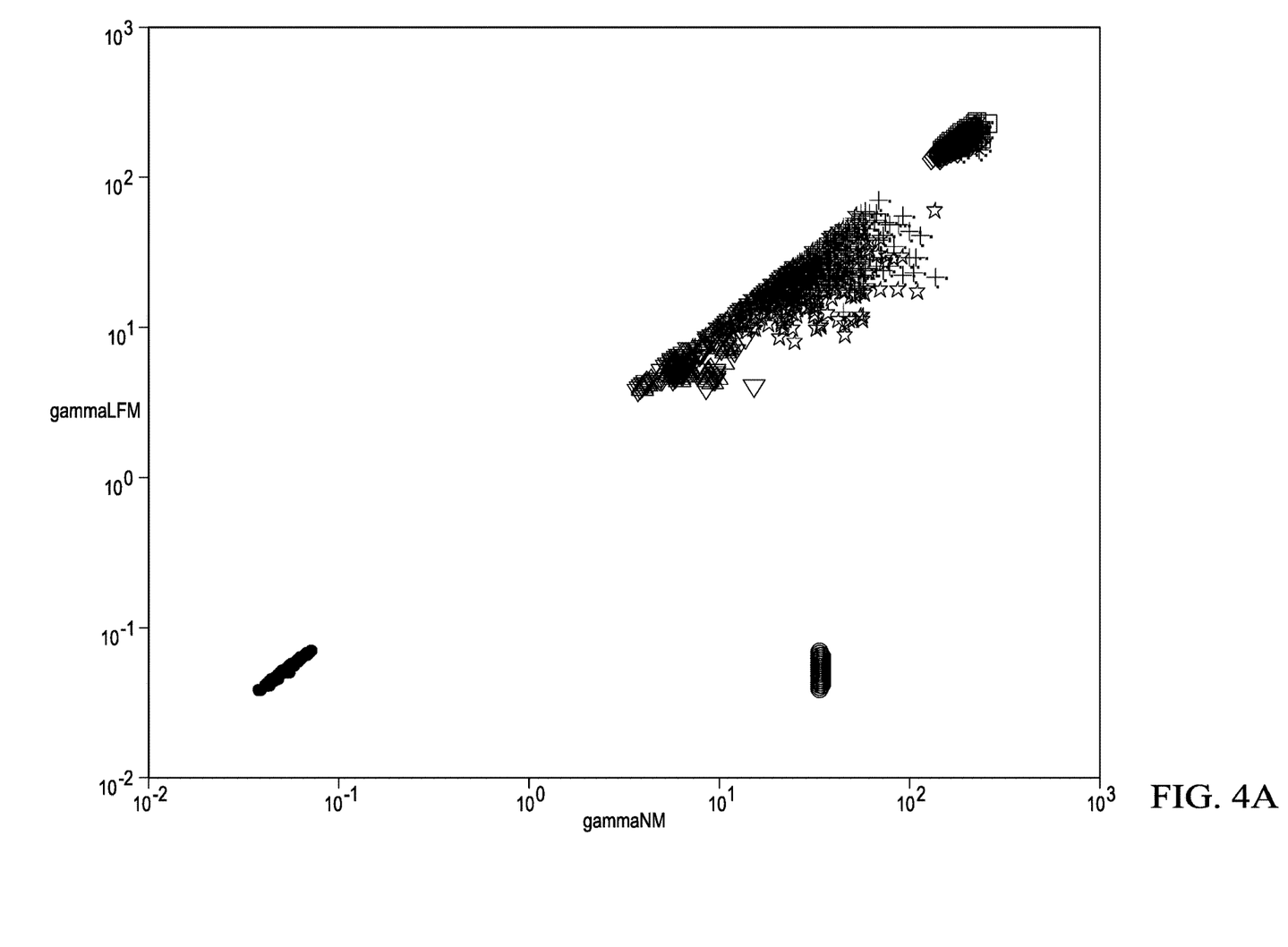
FIGS. 4A through 4C collectively illustrate three sets of 2D feature mappings for use by a machine learning system with binary pruning in developing modulation recognition discriminating vectors for automatic modulation recognition in accordance with embodiments of the present disclosure.
Figure 4B:
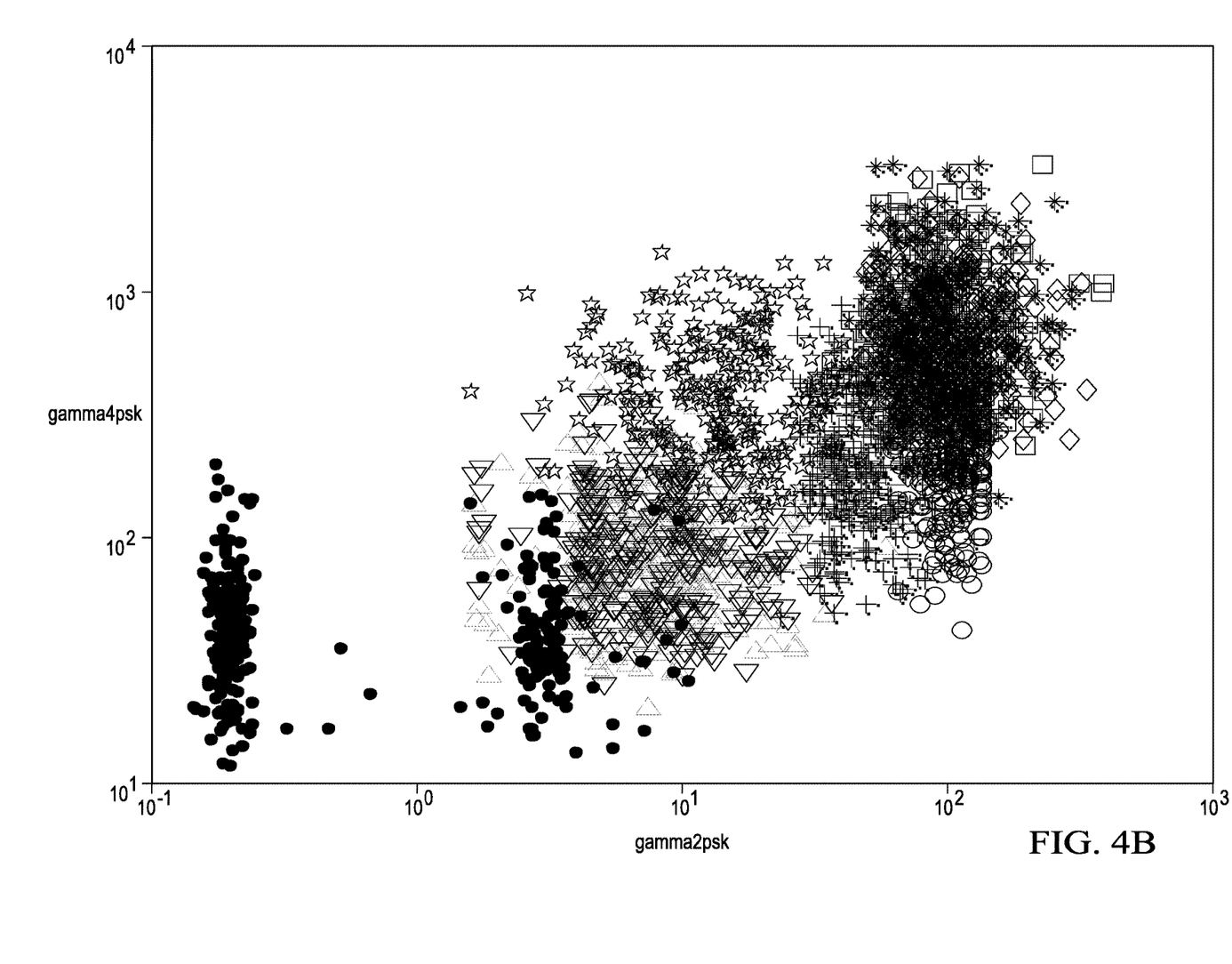
Figure 4C:
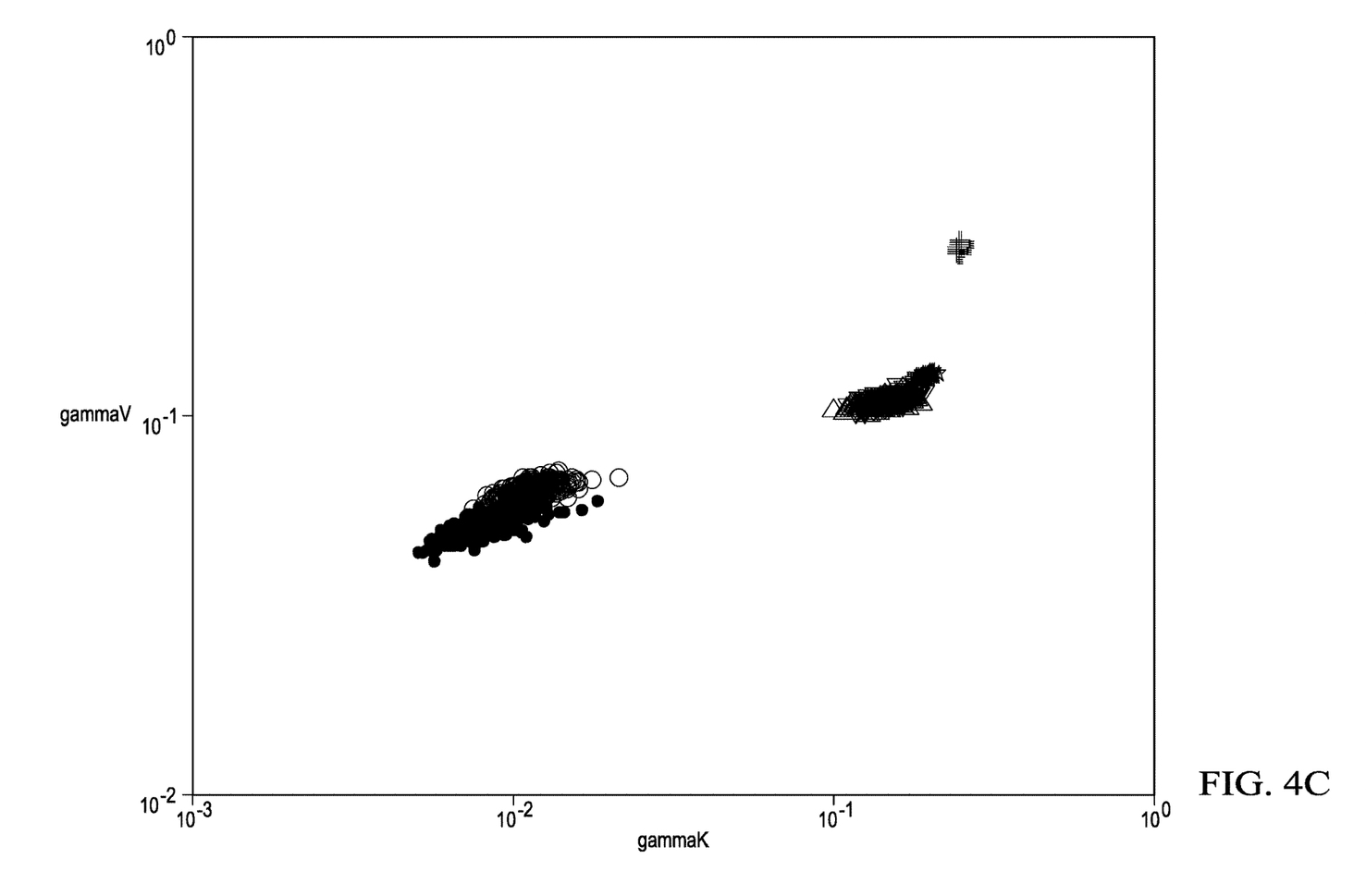

FIGS. 4A through 4C collectively illustrate three sets of 2D feature mappings for use by a machine learning system with binary pruning in developing modulation recognition discriminating vectors for automatic modulation recognition in accordance with embodiments of the present disclosure. Each of the sets includes samples for multiple modulation types from among the fourteen modulation types of interest, and may incorporate samples for all of those modulation types. The three sets illustrated correspond to the six features described above: FIG. 4A depicts MSE between an unwrapped phase and a LS parabolic fitting plotted against MSE between the unwrapped phase and an LS linear fitting; FIG. 4B depicts MSE between the unwrapped (4x) phase and its LS linear fitting plotted against MSE between the unwrapped (2x) phase and its LS linear fitting; and FIG. 4C depicts kurtosis of the instantaneous frequency plotted against variance in the instantaneous frequency. These plots are employed by the SVMs 204 in determining candidate discrimination vectors within permutations of binary trees for automatic modulation recognition, with the binary tree permutations pruned according to which sequence most accurately recognizes any of the fourteen modulation types of interest.

Figure 5A:
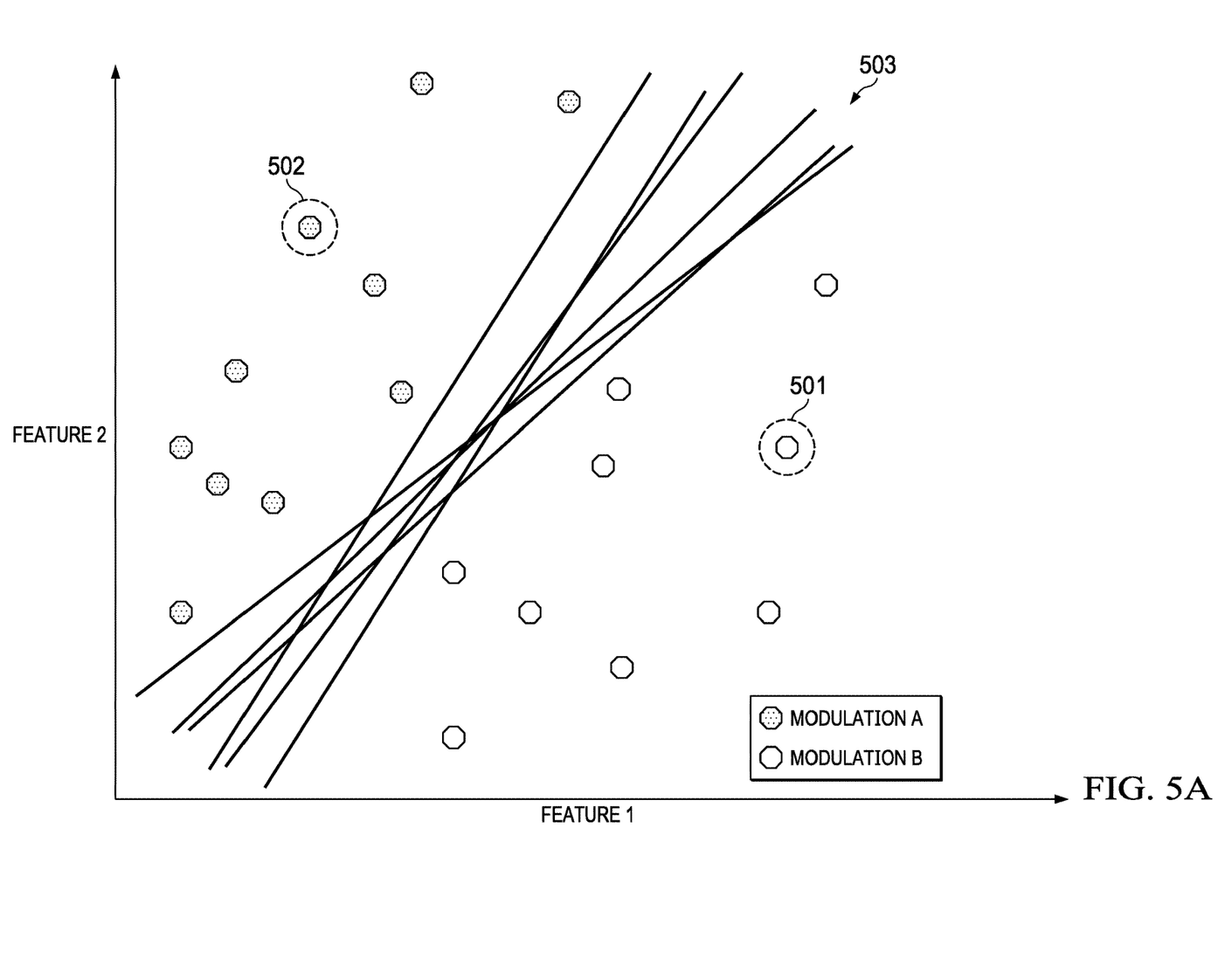
FIGS. 5A and 5B are simplified 2D feature mappings for just two different modulation types, provided to facilitate explanation of a support vector machine (SVM) approach to determining discriminating vectors.
Figure 5B:
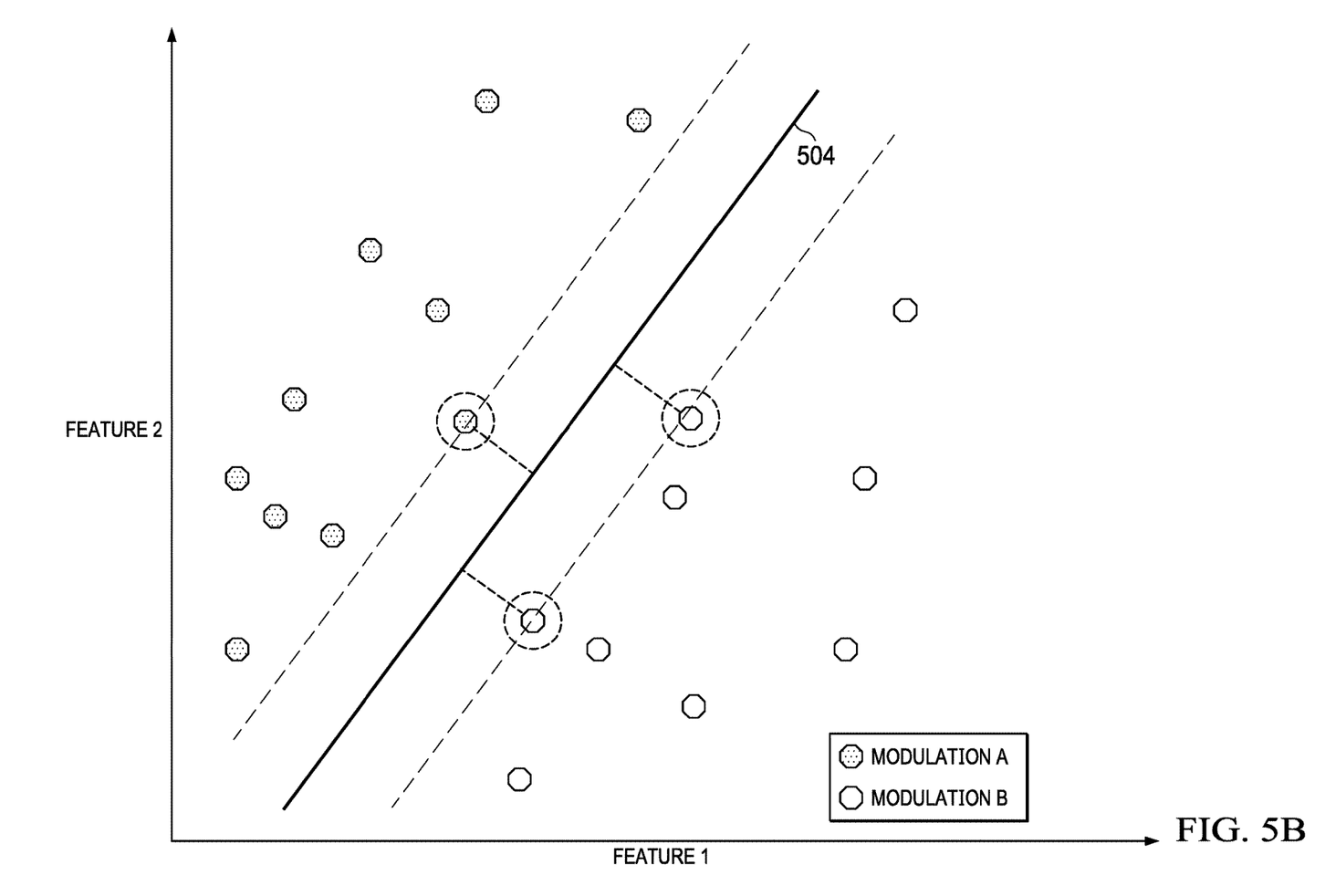

FIGS. 5A and 5B are simplified 2D feature mappings for just two different modulation types, provided to facilitate explanation of the SVM approach to determining discriminating vectors. In the simplified example of FIGS. 5A and 5B, just two different modulation types are represented by the data points: modulation A represented by data points 502 all located above and to the left of the solid lines in FIGS. 5A and 5B, and modulation B represented by data points 501 all located below and to the right of those solid lines. The data points represent extracted feature 2 of modulations A and B plotted against extracted feature 1. The goal of SVM is to find an optimal linear "separator" (vector of a given slope, each illustrated as a solid line in FIGS. 5A and 5B) that can be used to divide data points 501 and 502 for modulation A and B, respectively. As illustrated in FIG. 5A, multiple separator lines 503 of different slope are typically possible with most 2D plots. According to both intuition and sound probably approximately correct (PAC) learning theory, maximizing the margin between a separator line and the two sets of data points 501, 502 is preferable. As illustrated in FIG. 5B, a separator line 504 may be determined that is maximally spaced within the 2D plot (i.e., having the largest margin) from both sets of data points 501, 502, which is referred to a support vector. The implication of this theory is that only support vectors matter, and that other training examples may be ignored.

These principles of discrimination are employed in connection with each of the three sets of 2D feature mappings depicted in FIGS. 4A-4C, which correspond to signals of the 14 different modulation types discussed above. While individual modulation types are difficult to visually discriminate from the plots of FIGS. 4A-4C, multiple feature clusters are evident from the plots. For example, one feature cluster is apparent in FIG. 4A within the region between $10^{-2}$ and $10^{-1}$ on both the horizontal and vertical axes, while a second cluster in apparent within the region between $10^{-2}$ and $10^{-1}$ on the vertical axis and $10^1$ and $10^2$ on the horizontal axis and a third feature cluster is apparent within the region between $10^2$ and $10^3$ on both the horizontal and vertical axes. Even the largest feature cluster in FIG. 4A, within the region between $10^0$ and $10^2$ on both the horizontal and vertical axes, can be seen to include two different (albeit overlapping) clusters of features. Support vectors between the different feature clusters may be used to differentiate modulation types in real time, based on received signals of unknown modulation. SVMs 204 and binary pruning processor(s) 203 iteratively process permutation of binary trees for each of the three sets of 2D feature mappings depicted in FIGS. 4A-4C to derive support vectors discriminating the 14 different modulation types and identifying a preferred order of applying those modulation recognition discriminating vectors for use in the determined order by the modulation identification flow down processor(s) 303.

Figure 6A:
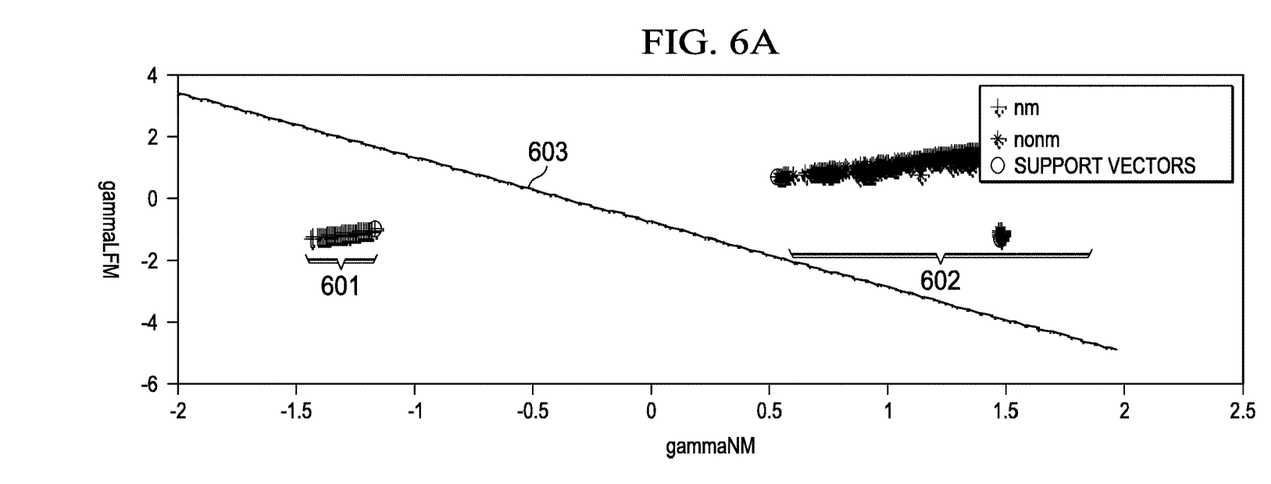
FIGS. 6A-6H illustrate binary tree pruning in connection with SVM use of support vectors to discriminate modulations of different types.
Figure 6B:
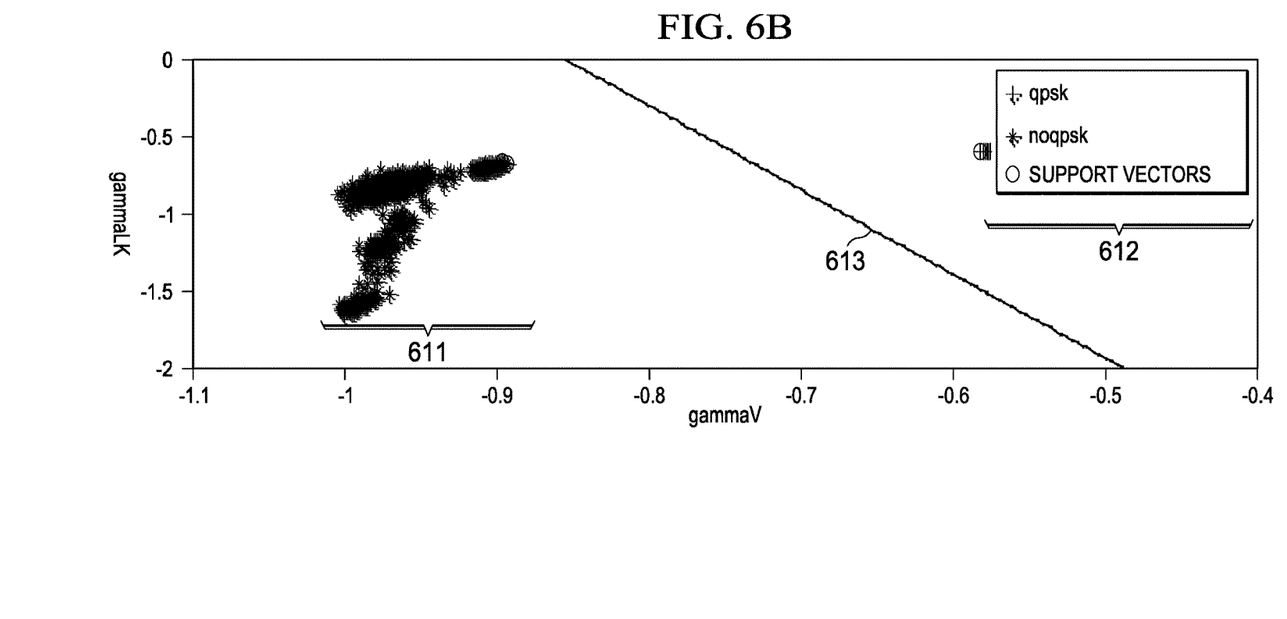
Figure 6C:
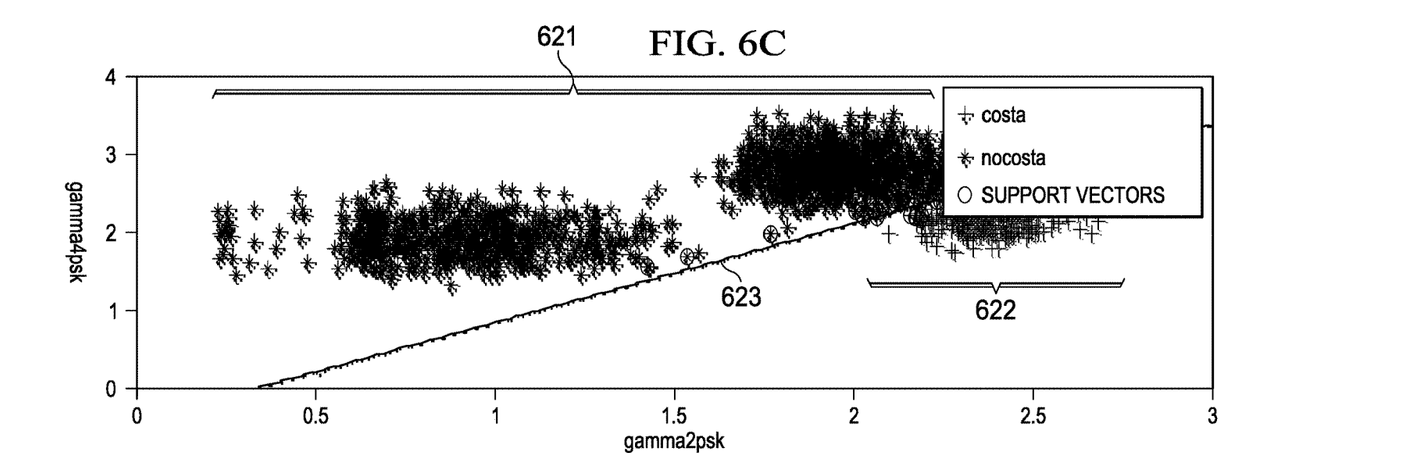
Figure 6D:
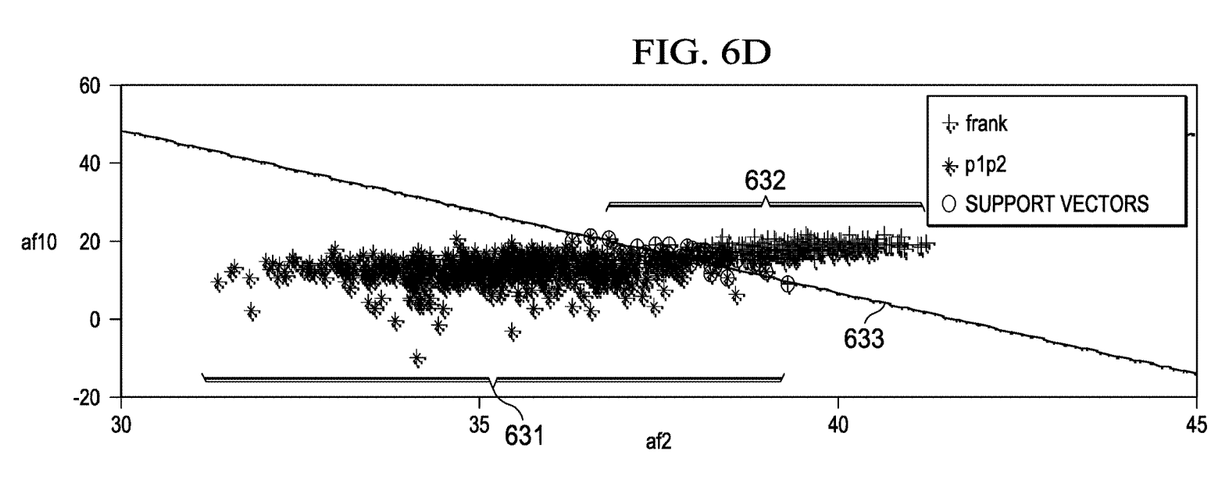
Figure 6E:
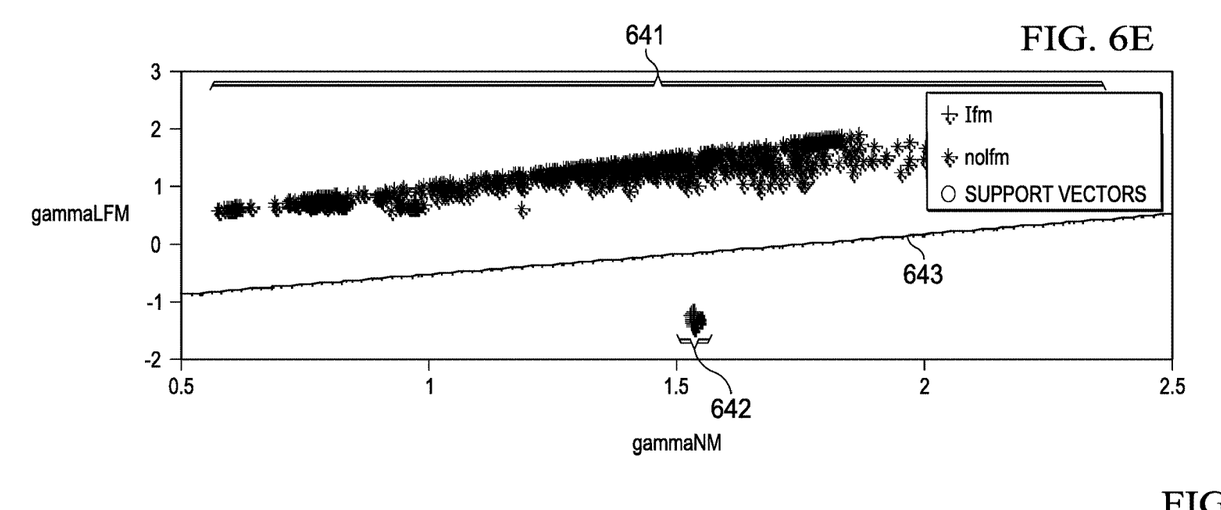
Figure 6F:
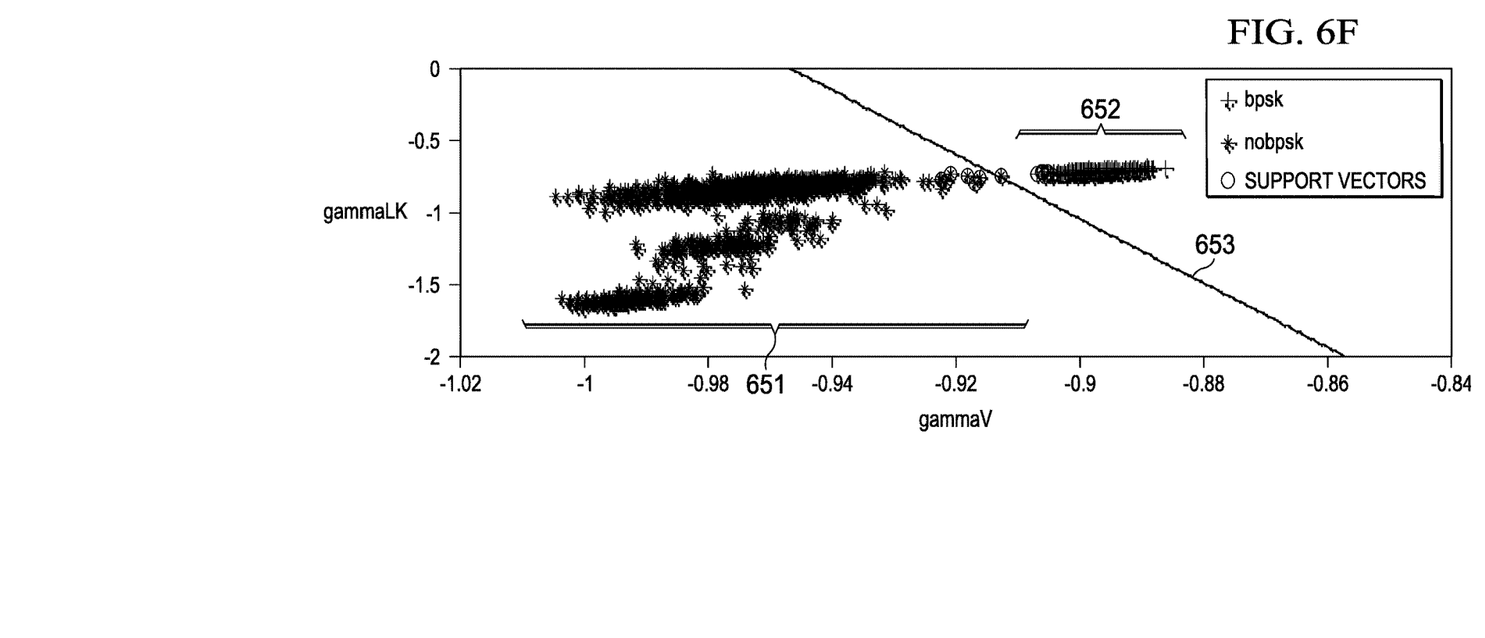
Figure 6G:
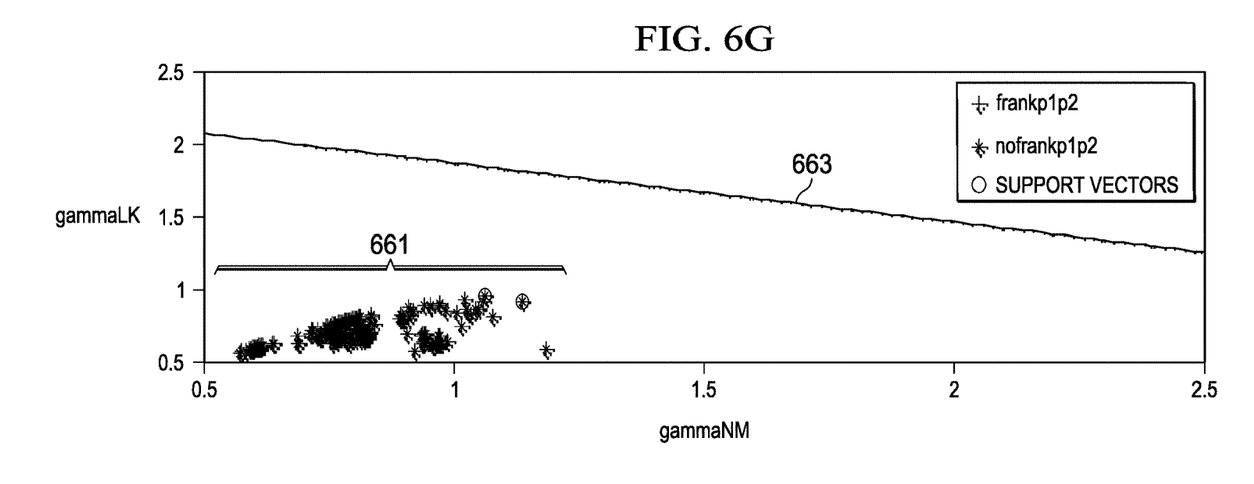
Figure 6H:
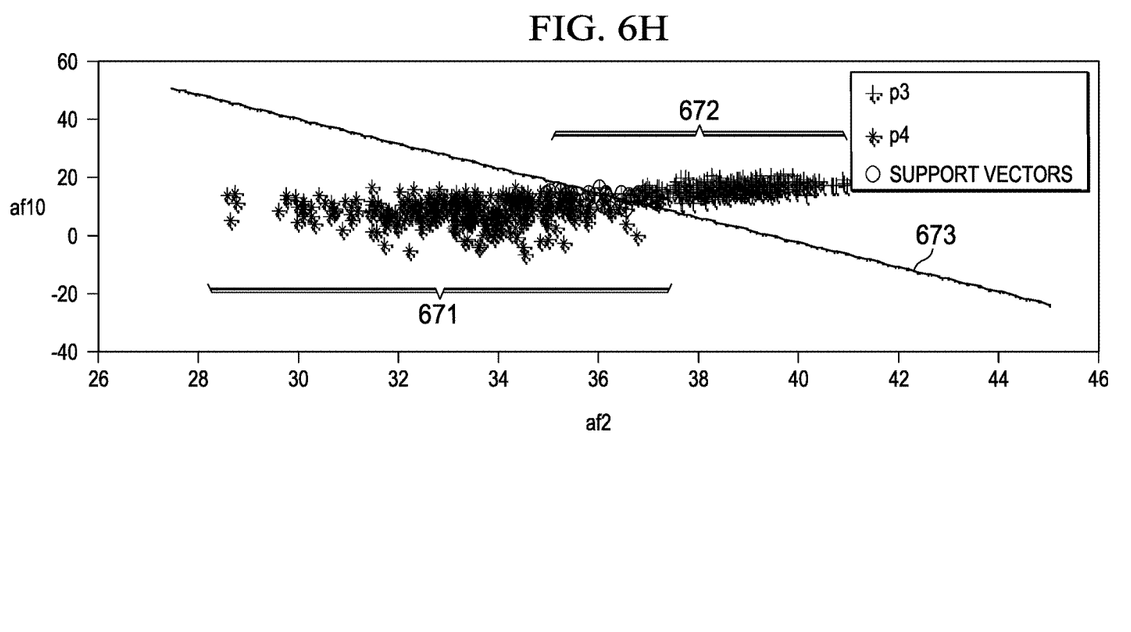

FIGS. 6A-6H illustrate binary tree pruning in connection with SVM use of support vectors to discriminate (or separate) modulations of different types. FIG. 6A illustrates a discriminating vector 603 between calculated features 601 for signals considered to have no modulation and calculated features 602 when the signals are considered to have some (unknown) type of modulation. FIG. 6B illustrates a discriminating vector 613 between calculated features 612 for signals treated as having qpsk modulation and calculated features 611 when the signals are considered not to have qpsk modulation. FIG. 6C illustrates a discriminating vector 623 between calculated features 622 for signals treated as having Costas code modulation and calculated features 621 when the signals are considered not to have Costas code modulation. FIG. 6D illustrates a discriminating vector 633 between calculated features 632 for signals treated as having Frank code modulation and calculated features 631 when the signals are considered to have either P1 or P2 polyphase code modulation. FIG. 6E illustrates a discriminating vector 643 between calculated features 642 for signals treated as having linear frequency modulation and calculated features 641 when the signals are considered to not have linear frequency code modulation. FIG. 6F illustrates a discriminating vector 653 between calculated features 652 and 651 for signals treated as having and not having, respectively, bpsk modulation. FIG. 6F illustrates a discriminating vector 663 between calculated features 661 for signals treated as having one of Frank code modulation or P1 or P2 polyphase code modulation, versus the signals when treated as not having such modulation. Finally, FIG. 6H illustrates a discriminating vector 673 between calculated features 672 treated as having P3 polyphase code modulation versus calculated features 671 for those signals treated as having P4 polyphase code modulation. FIGS. 6A-6H are merely exemplary of the different discriminating vectors that may be determined by SVMs 204 for possible binary trees pruned by pruning processor(s) 203. An optimal or otherwise most-preferred binary tree 206 of such discriminating vectors is then employed by modulation identification flow down processors 303.

Figure 7:
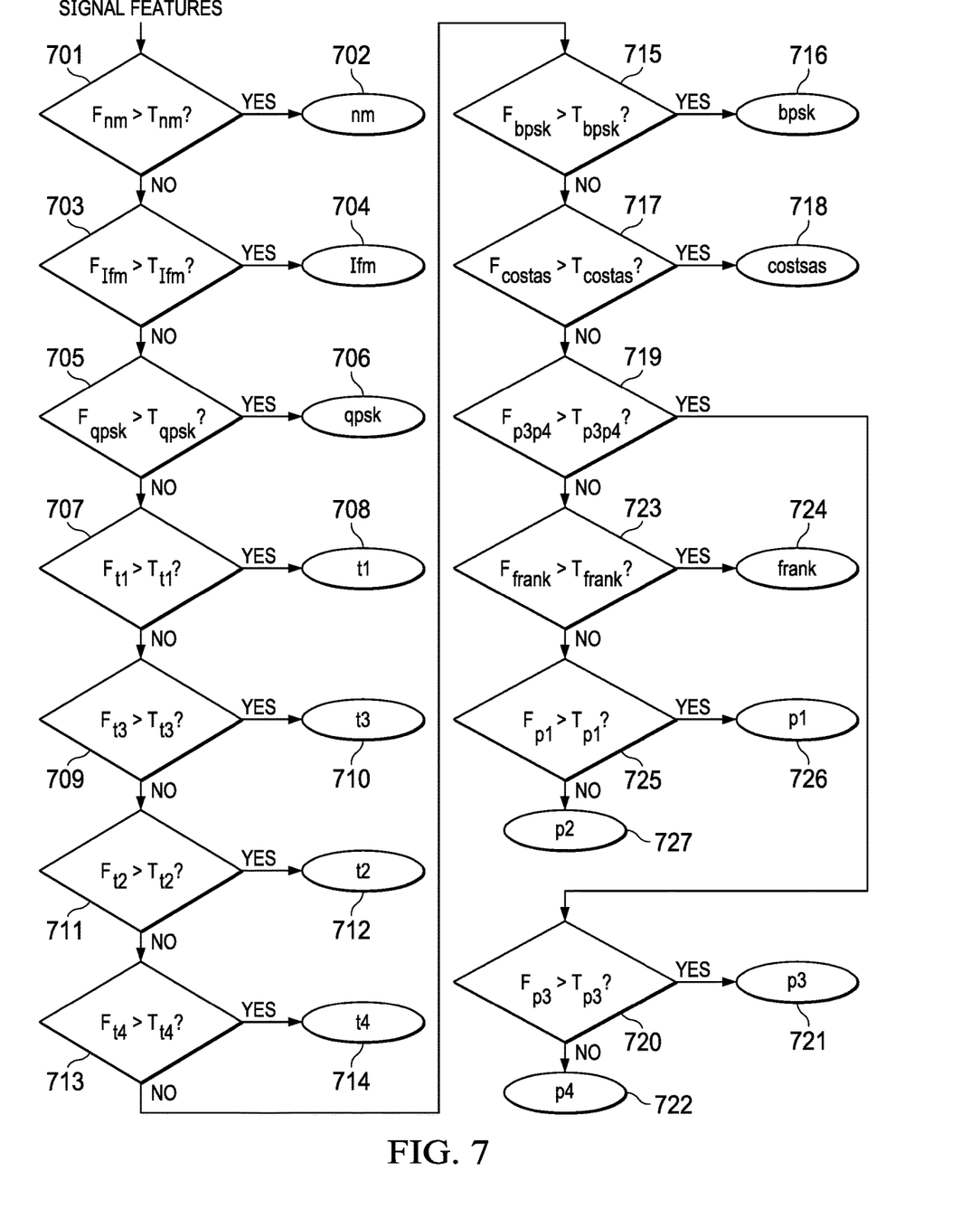
FIG. 7 is a high level flow diagram of one process for automatic modulation recognition in accordance with embodiments of the present disclosure.

FIG. 7 is a high level flow diagram of one process for automatic modulation recognition in accordance with an embodiment of the present disclosure. The process 700 illustrates automatic modulation recognition for the fourteen modulation types using the six features described above. Variations are possible based on different numbers of modulation types to be considered, and/or different numbers of features or 2D mappings of features. The process 700 uses a derived binary tree 206 of discriminating vectors and is performed primarily by modulation identification flow down processors 303.

The process 700 starts upon receipt of calculated features based on received radar signals of unknown modulation for the 14 modulation types identified above: no modulation; linear frequency modulation, qpsk and bpsk modulation; T1, T2, T3 or T4 polytime code modulation; Costas code modulation; Frank code modulation; and P1, P2, P3 or P4 polyphase code modulation. The exemplary process 700 begins with a determination of whether the calculated features $F_{nm}$ for no modulation of the received radar signals exceed a discriminating vector $T_{nm}$ for no modulation (step 701). If so, the unknown modulation type is identified as no modulation (step 702). If not, however, the process 700 proceeds to a determination of whether the calculated features $F_{lfm}$ for linear frequency modulation of the received radar signals exceed a discriminating vector $T_{lfm}$ for linear frequency modulation (step 703). If so, the unknown modulation type is identified as linear frequency modulation (step 704). If not, however, the process 700 proceeds to a determination of whether the calculated features $F_{qpsk}$ for qpsk modulation of the received radar signals exceed a discriminating vector $T_{qpsk}$ for qpsk modulation (step 705). If so, the unknown modulation type is identified as qpsk modulation (step 706). If not, however, the process 700 proceeds to a determination of whether the calculated features $F_{t1}$ for T1 polytime code modulation of the received radar signals exceed a discriminating vector $T_{t1}$ for T1 polytime code modulation (step 707). If so, the unknown modulation type is identified as T1 polytime code modulation (step 708).

From step 707, if calculated features $F_{t1}$ for T1 polytime code modulation of the received radar signals do not exceed a discriminating vector $T_{t1}$ for T1 polytime code modulation, the process 700 proceeds sequentially through determinations of whether the calculated features $F_{t3}$, $F_{t2}$, and $F_{t4}$ for (respectively) T3, T2 and T4 polytime code modulation of the received radar signals exceed a corresponding discriminating vector $T_{t3}$, $T_{t2}$, and $T_{t4}$ for (respectively) T3, T2 and T4 polytime code modulation (steps 709, 711 and 713, respectively). If any of the discriminating vectors $T_{t3}$, $T_{t2}$, and $T_{t4}$ is exceeded by the corresponding calculated feature $F_{t3}$, $F_{t2}$, and $F_{t4}$, the unknown modulation type is identified appropriately as T3, T2 or T4 polytime code modulation (steps 710, 712, and 714, respectively). If none of the discriminating vectors $T_{t3}$, $T_{t2}$, and $T_{t4}$ is exceeded by the corresponding calculated feature $F_{t3}$, $F_{t2}$, and $F_{t4}$, the process 700 proceeds to a determination of whether the calculated features $F_{bpsk}$ for bpsk modulation of the received radar signals exceed a discriminating vector $T_{bpsk}$ for bpsk modulation (step 715). If so, the unknown modulation type is identified as bpsk modulation (step 716). If not, however, the process 700 proceeds to a determination of whether the calculated features $F_{costas}$ for Costas code modulation of the received radar signals exceed a discriminating vector $T_{costas}$ for Costas code modulation (step 717). If so, the unknown modulation type is identified as Costas code modulation (step 718).

If the unknown modulation type is not identified as Costas code modulation (step 718), the process 700 proceeds to a determination of whether the calculated features $F_{p3p4}$ for either P3 or P4 polyphase code modulation of the received radar signals exceed a discriminating vector $T_{p3p4}$ for one of P3 or P4 polyphase code modulation (step 719). If so, the process 700 proceeds to a determination of whether the calculated features $F_{p3}$ for P3 polyphase code modulation of the received radar signals exceed a discriminating vector $T_{p3}$ for P3 polyphase code modulation (step 720), and the unknown modulation type is identified as P3 polyphase code modulation (step 721) if so, but is otherwise identified as P4 polyphase code modulation (step 722) if not.

Returning to step 719, if the calculated features $F_{p3p4}$ for either P3 or P4 polyphase code modulation of the received radar signals do not exceed a discriminating vector $T_{p3p4}$ for one of P3 or P4 polyphase code modulation, the process 700 proceeds instead to a determination of whether the calculated features $F_{frank}$ for Frank code modulation of the received radar signals exceed a discriminating vector $T_{frank}$ for Frank code modulation (step 723). If so, the unknown modulation type is identified as Frank code modulation (step 724). If not, the process 700 proceeds instead to a determination of whether the calculated features $F_{p1}$ for P1 polyphase code modulation of the received radar signals exceed a discriminating vector $T_{p1}$ for P1 polyphase code modulation (step 725), and the unknown modulation type is identified as P1 polyphase code modulation (step 726) if so, but is otherwise identified as P2 polyphase code modulation (step 727) if not.

It should be noted that although the T1 polytime code modulation determination (step 707) is made between the qpsk and T3/T2/T4 polytime code modulation determinations (step 705 and steps 709/711/713) in the process 700 depicted, an similarly efficient and accurate process could make that T1 polytime code modulation determination between the Costas code modulation determination (step 717) and the P3P4 polyphase code modulation determination (step 719). Such variants that result in comparable efficiency and accuracy will be understood by those skilled in the art to be as acceptable as the particular process 700 depicted in FIG. 7.

TABLE I below is a confusion matrix for modulation recognition using the flow down binary tree depicted in FIG. 7 for differentiating the 14 modulation types based on the six features described above:

TABLE I

| MOD | nm | lfm | qpsk | t3 | t2 | t4 | bpsk | Costas | t1 | frank | p1 | p2 | p3 | p4 |
|---|---|---|---|---|---|---|---|---|---|---|---|---|---|---|
| nm | 99.9 | 0.0 | 0.0 | 0.0 | 0.0 | 0.0 | 0.0 | 0.0 | 0.0 | 0.0 | 0.0 | 0.0 | 0.1 | 0.0 |
| lfm | 0.0 | 100.0 | 0.0 | 0.0 | 0.0 | 0.0 | 0.0 | 0.0 | 0.0 | 0.0 | 0.0 | 0.0 | 0.0 | 0.0 |
| qpsk | 0.0 | 0.0 | 97.9 | 0.0 | 0.0 | 0.0 | 0.0 | 0.0 | 0.0 | 0.0 | 0.0 | 0.0 | 0.0 | 2.1 |
| t3 | 0.0 | 0.0 | 0.0 | 100.0 | 0.0 | 0.0 | 0.0 | 0.0 | 0.0 | 0.0 | 0.0 | 0.0 | 0.0 | 0.0 |
| t2 | 0.0 | 0.0 | 0.0 | 0.0 | 97.3 | 0.0 | 1.7 | 0.0 | 0.0 | 1.0 | 0.0 | 0.0 | 0.0 | 0.0 |
| t4 | 0.0 | 0.0 | 0.0 | 0.0 | 1.4 | 97.4 | 0.0 | 0.0 | 0.0 | 1.2 | 0.0 | 0.0 | 0.0 | 0.0 |
| bpsk | 0.0 | 0.0 | 0.0 | 0.0 | 1.2 | 0.0 | 97.5 | 0.0 | 0.0 | 1.3 | 0.0 | 0.0 | 0.0 | 0.0 |
| Costas | 0.0 | 0.0 | 0.1 | 0.0 | 0.0 | 0.0 | 0.0 | 98.6 | 0.0 | 0.2 | 0.8 | 0.0 | 0.0 | 0.0 |
| t1 | 0.0 | 0.0 | 0.0 | 0.0 | 0.0 | 0.0 | 0.0 | 0.0 | 97.5 | 0.1 | 1.4 | 0.0 | 0.0 | 0.0 |
| frank | 0.0 | 0.0 | 0.0 | 0.0 | 0.0 | 0.0 | 1.8 | 0.0 | 0.0 | 98.0 | 0.0 | 0.0 | 0.0 | 0.2 |
| p1 | 0.0 | 0.0 | 0.0 | 0.0 | 0.0 | 0.0 | 0.0 | 4.8 | 0.3 | 0.0 | 94.9 | 0.0 | 0.0 | 0.0 |
| p2 | 0.0 | 0.0 | 0.0 | 0.0 | 0.0 | 0.0 | 0.0 | 0.0 | 0.0 | 0.0 | 0.2 | 99.8 | 0.0 | 0.0 |
| p3 | 0.0 | 0.0 | 0.0 | 0.0 | 0.0 | 0.0 | 0.0 | 0.0 | 0.0 | 0.0 | 0.0 | 0.0 | 100.0 | 0.0 |
| p4 | 0.0 | 0.0 | 1.2 | 0.0 | 0.0 | 0.0 | 0.0 | 0.0 | 0.0 | 0.0 | 0.0 | 0.0 | 0.0 | 98.8 |

As evident, the very high accuracy was determined to exist for all 14 modulation types, typically greater than 97% with only one entry less than that, but still about 95% accurate. Very low potential low potential for incorrect identification (as opposed to failure of identification) was found to exist based on the approach described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f)

with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. A method within a radio system, comprising:
    receiving, at at least one antenna, radio signals including modulated radar signals of an unknown modulation type from among a group of predetermined modulation types;
    using at least one feature extraction processor:
        extracting a plurality of features for the received radio signals, and
        generating a plurality of two dimensional (2D) maps corresponding to pairs of the extracted features, wherein each 2D map is associated with (i) one dimension that corresponds to one extracted feature in the corresponding pair of extracted features and (ii) another dimension that corresponds to another extracted feature in the corresponding pair of extracted features; and
    using at least one modulation identification processor, processing the 2D maps using a binary tree of discriminating vectors, each of the discriminating vectors corresponding to recognition of at least one of the predetermined modulation types based on the 2D maps, each of the discriminating vectors determined by processing training 2D maps for pairs of features extracted from training samples using a support vector machine learning algorithm,
    wherein the binary tree is derived by pruning permutations of sequences for applying the discriminating vectors according to iterative testing of modulation type recognition accuracy.

2. The method according to claim 1, wherein the extracted features comprise:
    mean square error (MSE) between an unwrapped phase and a least squares (LS) linear fitting of the unwrapped phase,
    MSE between the unwrapped phase and a LS parabolic fitting of the unwrapped phase,
    variance in an instantaneous frequency,
    kurtosis of the instantaneous frequency,
    MSE between an unwrapped binary phase and a LS linear fitting of the unwrapped binary phase, and
    MSE between an unwrapped quadrature phase and a LS linear fitting of the unwrapped quadrature phase.

3. The method according to claim 2, wherein the 2D maps corresponding to the pairs of the extracted features comprise:
    the MSE between the unwrapped phase and the LS parabolic fitting of the unwrapped phase plotted against the MSE between the unwrapped phase and the LS linear fitting of the unwrapped phase,
    the kurtosis of the instantaneous frequency plotted against the variance in the instantaneous frequency, and
    the MSE between the unwrapped quadrature phase and the LS linear fitting of the unwrapped quadrature phase plotted against the MSE between the unwrapped binary phase and the LS linear fitting of the unwrapped binary phase.

4. The method according to claim 1, wherein the predetermined modulation types comprise:
    no modulation;
    linear frequency modulation;
    binary phase shift key modulation;
    quadrature phase shift key modulation;
    each of T1, T2, T3 and T4 polytime code modulation;
    Costas code modulation;
    Frank code modulation; and
    each of P1, P2, P3 and P4 polyphase code modulation.

5. The method according to claim 1, wherein each of the discriminating vectors determined using the support vector machine learning algorithm comprises a support vector having equal margins from data differentiated by the support vector.

6. The method according to claim 1, wherein the discriminating vectors of the binary tree are applied in the following sequence by modulation type until the unknown modulation type is recognized:
    no modulation;
    linear frequency modulation;
    quadrature phase shift key modulation;
    T1 polytime code modulation;
    T3 polytime code modulation;
    T2 polytime code modulation;
    T4 polytime code modulation;
    binary phase shift key modulation;
    Costas code modulation;
    either of P3 and P4 polyphase code modulation;
    Frank code modulation; and
    either of P1 and P2 polyphase code modulation.

7. The method according to claim 1, wherein correct recognition and classification of the unknown modulation type occurs greater than 94% of the time for each of the predetermined modulation types.

8. The method according to claim 1, wherein 300 training samples for each of the predetermined modulation types are used by the support vector machine learning algorithm to determine the discriminating vectors.

9. A system, comprising:
    one or more antennas configured to receive radio signals including modulated radar signals of an unknown modulation type from among a group of predetermined modulation types;
    one or more feature extraction processors coupled to receive the received radio signals and configured to:
        extract a plurality of features for the received radio signals, and
        generate a plurality of two dimensional (2D) maps corresponding to pairs of the extracted features, wherein each 2D map is associated with (i) one dimension that corresponds to one extracted feature in the corresponding pair of extracted features and (ii) another dimension that corresponds to another extracted feature in the corresponding pair of extracted features; and
    one or more binary tree pruning processors and one or more support vector machines collectively configured to iteratively process the 2D maps using a binary tree of discriminating vectors, each of the discriminating vectors corresponding to recognition of at least one of the predetermined modulation types based on the 2D maps, each of the discriminating vectors determined by processing training 2D maps for pairs of features extracted from training samples using a support vector machine learning algorithm,
wherein the binary tree is derived by pruning permutations of sequences for applying the discriminating vectors according to iterative testing of modulation type recognition accuracy.

10. The system according to claim 9, wherein the extracted features comprise:
mean square error (MSE) between an unwrapped phase and a least squares (LS) linear fitting of the unwrapped phase,
MSE between the unwrapped phase and a LS parabolic fitting of the unwrapped phase,
variance in an instantaneous frequency,
kurtosis of the instantaneous frequency,
MSE between an unwrapped binary phase and a LS linear fitting of the unwrapped binary phase, and
MSE between an unwrapped quadrature phase and a LS linear fitting of the unwrapped quadrature phase.

11. The system according to claim 10, wherein the 2D maps corresponding to the pairs of the extracted features comprise:
the MSE between the unwrapped phase and the LS parabolic fitting of the unwrapped phase plotted against the MSE between the unwrapped phase and the LS linear fitting of the unwrapped phase,
the kurtosis of the instantaneous frequency plotted against the variance in the instantaneous frequency, and
the MSE between the unwrapped quadrature phase and the LS linear fitting of the unwrapped quadrature phase plotted against the MSE between the unwrapped binary phase and the LS linear fitting of the unwrapped binary phase.

12. The system according to claim 9, wherein the predetermined modulation types comprise:
no modulation;
linear frequency modulation;
binary phase shift key modulation;
quadrature phase shift key modulation;
each of T1, T2, T3 and T4 polytime code modulation;
Costas code modulation;
Frank code modulation; and
each of P1, P2, P3 and P4 polyphase code modulation.

13. The system according to claim 9, wherein each of the discriminating vectors determined using the support vector machine learning algorithm comprises a support vector having equal margins from data differentiated by the support vector.

14. The system according to claim 9, wherein the discriminating vectors of the binary tree are applied in the following sequence by modulation type until the unknown modulation type is recognized:
no modulation;
linear frequency modulation;
quadrature phase shift key modulation;
T1 polytime code modulation;
T3 polytime code modulation;
T2 polytime code modulation;
T4 polytime code modulation;
binary phase shift key modulation;
Costas code modulation;
either of P3 and P4 polyphase code modulation;
Frank code modulation; and
either of P1 and P2 polyphase code modulation.

15. The system according to claim 9, wherein correct recognition and classification of the unknown modulation type occurs greater than 94% of the time for each of the predetermined modulation types.

16. The system according to claim 9, wherein 300 training samples for each of the predetermined modulation types are used by the support vector machine learning algorithm to determine the discriminating vectors.

17. A method, comprising:
using a signal data generator, generating training samples for modulated radar signals of each of a group of predetermined modulation types;
using at least one feature extraction processor:
extracting a plurality of features for the training samples, and
generating a plurality of two dimensional (2D) maps corresponding to pairs of the extracted features, wherein each 2D map is associated with (i) one dimension that corresponds to one extracted feature in the corresponding pair of extracted features and (ii) another dimension that corresponds to another extracted feature in the corresponding pair of extracted features; and
using at least one binary tree pruning processor coupled to at least one support vector machine, iteratively processing the 2D maps to determine a binary tree of discriminating vectors, each of the discriminating vectors corresponding to recognition of at least one of the predetermined modulation types based on the 2D maps,
wherein the binary tree is derived by pruning permutations of sequences for applying the discriminating vectors according to iterative testing of modulation type recognition accuracy.

18. The method according to claim 17, wherein the extracted features comprise:
mean square error (MSE) between an unwrapped phase and a least squares (LS) linear fitting of the unwrapped phase,
MSE between the unwrapped phase and a LS parabolic fitting of the unwrapped phase,
variance in an instantaneous frequency,
kurtosis of the instantaneous frequency,
MSE between an unwrapped binary phase and a LS linear fitting of the unwrapped binary phase, and
MSE between an unwrapped quadrature phase and a LS linear fitting of the unwrapped quadrature phase.

19. The method according to claim 18, wherein the 2D maps corresponding to the pairs of the extracted features comprise:
the MSE between the unwrapped phase and the LS parabolic fitting of the unwrapped phase plotted against the MSE between the unwrapped phase and the LS linear fitting of the unwrapped phase,
the kurtosis of the instantaneous frequency plotted against the variance in the instantaneous frequency, and
the MSE between the unwrapped quadrature phase and the LS linear fitting of the unwrapped quadrature phase plotted against the MSE between the unwrapped binary phase and the LS linear fitting of the unwrapped binary phase.

20. The method according to claim 17, wherein the predetermined modulation types comprise:
no modulation;
linear frequency modulation;
binary phase shift key modulation;
quadrature phase shift key modulation;
each of T1, T2, T3 and T4 polytime code modulation;
Costas code modulation;
Frank code modulation; and
each of P1, P2, P3 and P4 polyphase code modulation.

* * * * *

UNITED STATES PATENT AND TRADEMARK OFFICE
CERTIFICATE OF CORRECTION

PATENT NO. : 10,915,833 B2  Page 1 of 1
APPLICATION NO. : 15/499653
DATED : February 9, 2021
INVENTOR(S) : Phuoc T. Ho et al.

It is certified that error appears in the above-identified patent and that said Letters Patent is hereby corrected as shown below:

On the Title Page

Item (72), change "Dan" to "George D."

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*